(No Model.) 2 Sheets—Sheet 1.
M. L. LONG.
DENTIST'S CHAIR.
No. 303,171. Patented Aug. 5, 1884.
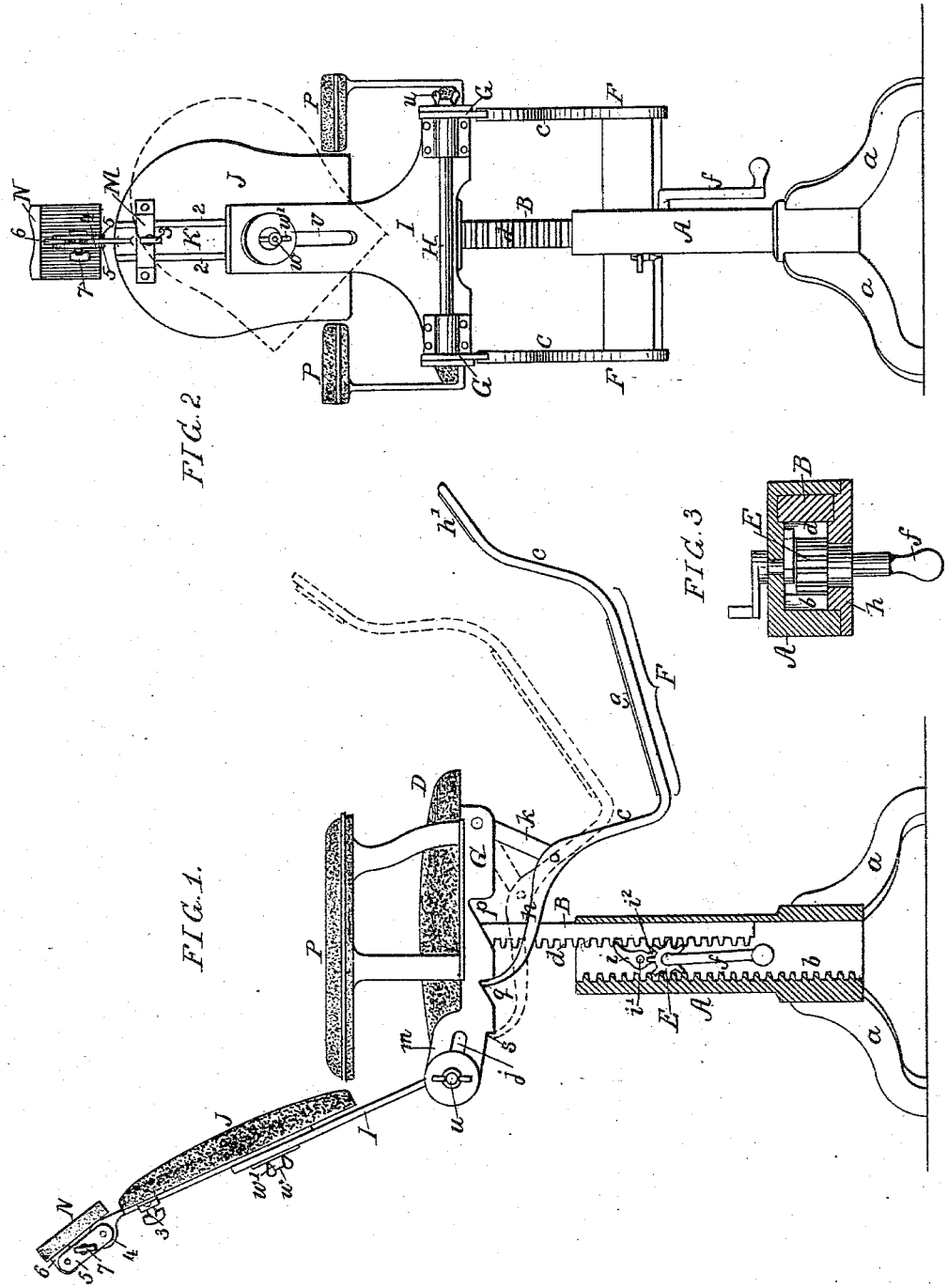
WITNESSES:
James T. Tobin
John E. Barker
INVENTOR:
M. Lukens Long
by his Attorneys
Howson & Son (No Model.)  2 Sheets—Sheet 2.
M. L. LONG.
DENTIST'S CHAIR.
No. 303,171.  Patented Aug. 5, 1884.
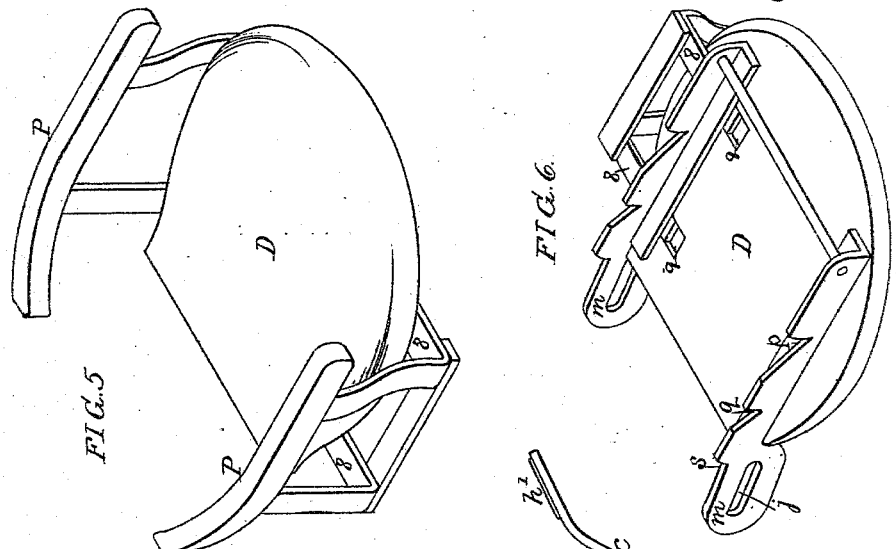
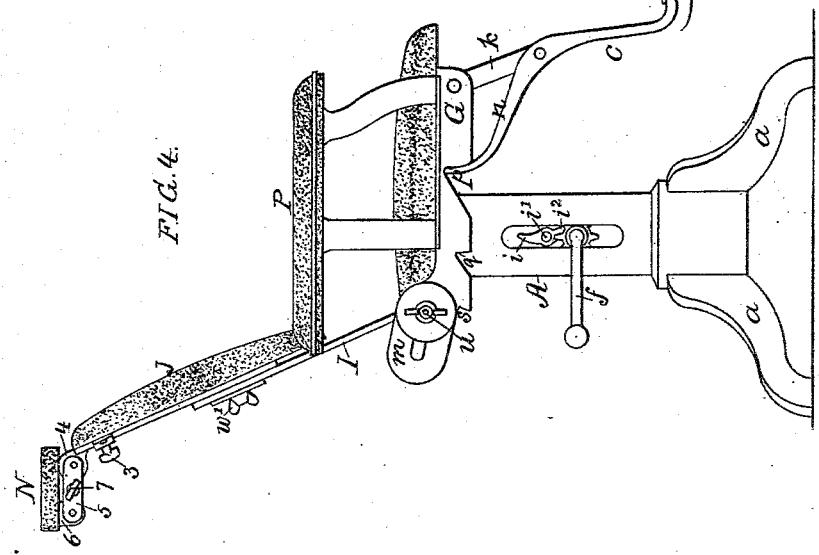
WITNESSES:
James F. Jobin
John E. Parker
INVENTOR
M. Lukens Long
by his Attorneys
Howson & Sons United States Patent Office.

M. LUKENS LONG, OF PHILADELPHIA, PENNSYLVANIA.

DENTIST'S CHAIR.

SPECIFICATION forming part of Letters Patent No. 303,171, dated August 5, 1884.

Application filed November 8, 1883. (No model.)

*To all whom it may concern:*

Be it known that I, M. LUKENS LONG, a citizen of the United States, and a resident of Philadelphia, Pennsylvania, have invented certain Improvements in Dentists' Chairs, of which the following is a specification.

My invention consists of certain improvements in dental chairs, my improvements, which are fully described and claimed hereafter, being directed to mechanism for the ready adjustment of the foot-supports.

In the accompanying drawings, Figure 1, Sheet 1, is a side view of my improved dental chair, the stand being in section; Fig. 2, a rear view; Fig. 3, a sectional plan (drawn to an enlarged scale) of the stand; Fig. 4, Sheet 2, a side view showing the foot-rest in a position differing from that shown in Fig. 1; Fig. 5, a perspective view of the seat, and Fig. 6 an inverted perspective view of the same.

The stand A of the chair consists of a hollow box of metal, provided with suitable legs, $a$, and to vertical guides in this stand is adapted the seat-supporting bar B, in the manner best observed in the sectional plan, Fig. 3, the upper end of the bar being secured in any suitable manner, preferably by a swivel-joint, to the under side of the seat, and a rack, $d$, being formed on one edge of the said bar.

In the box A, and preferably forming a part thereof, is a second rack, $b$, directly opposite the rack of the supporting-bar, and between the two racks is a pinion, E, the teeth of which gear into those of both racks. This pinion is secured to or forms part of a short shaft, $e$, provided with a handle or lever, $f$, the shaft projecting through a vertically-elongated slot in the cover-plate $h$ of the box, (see Figs. 3 and 4), this plate serving to keep the pinion and supporting-rod in place within the box. The pinion-shaft has no bearings, as it must move up or down within the box when the supporting-bar is raised or lowered by operating the lever, the teeth of the fixed rack forming the fulcrum for the pinion when the latter is turned to raise the supporting-bar. This duplex-rack arrangement with intervening pinion has the advantage of permitting the dentist to raise and lower the seat by a much less movement of the operating-lever than if a pinion having bearings in the stand should be combined with a rack on the seat-supporting-bar. It should be here understood that I do not claim the above-described device for raising and lowering the seat. There is within the box a small pawl, $i$, for engaging into the teeth of the rack of the said supporting-bar and maintaining the same at any altitude to which it may have been adjusted, the pawl being on a small spindle, $i'$, which passes through the side of the box, and is furnished with a handle which is within easy reach of the dentist. The pawl has a projecting tail, $i^2$, which possesses a certain elasticity, and is of such a character that when the pawl is withdrawn from the teeth the tail $i^2$ will bear upon the ends of the same, and will thus form a friction-brake to prevent too rapid a descent of the seat. Other devices for retaining and releasing the seat-supporting bar may be adopted. A set-screw, for instance, may pass through the stand so as to enter one of a number of notches in the bar.

The foot-supporting frame F consists of two metal bars, $c\ c$, bent to the form shown in Figs. 1 and 4, and connected together by the foot-boards $g$ and $h'$, the bars $c$ being connected by links $k\ k$ to the under side of the seat, preferably to ribs G G.

The bent bars $c\ c$ of the foot-supporting frame have rear extensions, $n$, for engaging with notches in the ribs G G; or the notches may be in the seat itself. When the ends of these extensions $n$ of the frame are in the notches, $p$, nearest the front of the seat, the foot-support will be in the position shown in Fig. 4—a position suitable for the accommodation of a tall patient. By adjusting the foot-supporting frame so that the extensions $n$ of its bars will engage in the next notches, $q$, of the ribs G, the supporting-frame will have been moved inward, and at the same time elevated at its outer end to the position shown in Fig. 1, so as to accommodate a patient of average size, and when the extensions $n$ of the bars of the foot-support engage into the last notches, $s$, of the ribs G, the rest will be in the position indicated by dotted lines in Fig. 1, and this position will be suitable for the accommodation of a child. To the rear of the seat are secured plates $m$, which in the present instance are extensions of the two ribs G G, and these extensions have elongated slots, through which passes a bolt, H, and to the latter is hinged a plate, I, which carries the back and head-rest of the chair, a projecting threaded end of the bolt being furnished with a thumb-nut, $u$. After loosening this nut, the plate I, and with it the back and head-rest of the chair, can be adjusted to and from the back of the seat to any extent permitted by the elongated slots $j$. The plate I, moreover, can be adjusted to any desired inclination, as it is hinged to the bolt H; but when the nut $u$ is tightened the plate is so confined between the two plates $m\ m$ that it will remain in the position to which it has been adjusted. The plate I has an elongated slot, $v$, through which passes a threaded stud, $w$, secured to the rear of the back J of the chair, so that the said back can be raised or lowered or moved laterally on the stud as a pivot, and secured after adjustment by a thumb-nut, $w'$, adapted to the said stud.

Between guides 2 2 at the rear of the back is the bar K, which carries the head-rest, and which can be raised and lowered, and can be secured after adjustment by a set-screw, 3, passing through a cross-plate, M, which is secured to the rear of the back, and keeps the bar K in place.

To a projection, 4, on the upper edge of the bar K are connected the lower ends of two links, 5 5, the upper ends of which are hinged to a plate, 6, secured to the back of the head-rest N, which thus admits of being adjusted to many different positions, in any of which it may be retained by imparting proper friction to the joints of the links. In the present instance the retaining-friction is effected by a set-screw, 7, on tightening which the two links are made to embrace the projection 4 of the bar K and the plate 6 of the head-rest.

The seat D (shown in Fig. 5) has two arms, P P, one of which is adjustable so as to suit the convenience of stout or thin patients. This adjustment is effected by providing one of the arms P with plates 8 8, which fit snugly, but so as to slide, in suitable guides, 9, on the under side of the seat, to which the bars may be confined by the ribs G, in the manner shown in Fig. 6. If desired, both arms may be thus made adjustable.

I do not desire to claim, broadly, the combination of the stand or box A and its rack with a shaft having a pinion, E, gearing into a rack on the seat-supporting bar B; but

I claim as my invention—

1. The combination of a supporting-stand and a seat, D, having notches, with a foot-supporting frame, F, having extensions $n$, adapted to engage said notches, and links $k$, connecting the said frame and seat, substantially as set forth.

2. The combination of the seat D and its notched ribs G with the foot-supporting frame composed of bent bars $c\ c\ n$ and foot-board $g$ and $h'$, and with links $k\ k$ for connecting the frame to the seat, substantially as specified.

In testimony whereof I have signed my name to this specification in the presence of two subscribing witnesses.

M. LUKENS LONG.

Witnesses:
JOHN M. CLAYTON,
HARRY SMITH.